(12) United States Patent     (10) Patent No.:   US 12,666,113 B2

Heo       (45) Date of Patent:    Jun. 23, 2026

(54) METHOD AND DEVICE FOR STREAMING DATA BASED ON TRANSMISSION RATE CONTROL METHOD

(71) Applicant: Electronics and Telecommunications Research Institute, Daejeon (KR)

(72) Inventor: Hwan Jo Heo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/963,395

(22) Filed: Nov. 27, 2024

(65) Prior Publication Data

US 2025/0184576 A1     Jun. 5, 2025

(30) Foreign Application Priority Data

Nov. 30, 2023    (KR) ........................ 10-2023-0171260

(51) Int. Cl.
   *H04N 21/6373*      (2011.01)
   *H04N 21/44*       (2011.01)

(52) U.S. Cl.
   CPC ... *H04N 21/6373* (2013.01); *H04N 21/44004* (2013.01)

(58) Field of Classification Search
   CPC ......... H04N 21/6373; H04N 21/44004; H04N 21/64784; H04N 21/6125; H04N 21/64761; H04N 21/8456; H04L 65/613; H04L 65/00; H04L 65/612
   See application file for complete search history.

(56) References Cited

U.S. PATENT DOCUMENTS

| | | |
|---|---|---|
| 7,054,365 B2 | 5/2006 | Kim et al. |
| 10,362,348 B2 | 7/2019 | Shahmoon et al. |
| 2011/0296046 A1* | 12/2011 | Arya ..................... H04L 65/752 |
| | | 709/236 |
| 2017/0208106 A1* | 7/2017 | Chung ............... H04N 21/8456 |
| 2019/0200094 A1* | 6/2019 | Jarman ............ H04N 21/64784 |

FOREIGN PATENT DOCUMENTS

| | | |
|---|---|---|
| KR | 10-2017-0018604 A | 2/2017 |
| WO | 2012/008792 A3 | 1/2012 |

OTHER PUBLICATIONS

Holohan, Naoise et al. "The Bounded Laplace Mechanism in Differential Privacy", arXiv: 1808.10410v1 [cs.CR], Aug. 2018.

(Continued)

*Primary Examiner* — Alazar Tilahun

(74) *Attorney, Agent, or Firm* — BROADVIEW IP LAW, PC

(57) ABSTRACT

A method and device for streaming data based on a transmission rate control method are disclosed. According to one embodiment of the present disclosure, a method performed by a device may include performing buffering on video content for a first predetermined time period based on a start time of a first epoch; determining a first transmission rate in the first epoch based on an amount of data transmitted according to the buffering and traffic pattern information of the video content; providing the video content at the first transmission rate from a time point at which the buffering is completed to a time point at which the first epoch ends.

13 Claims, 6 Drawing Sheets

(56) References Cited

OTHER PUBLICATIONS

Schuster, Roei et al. "Beauty and the Burst: Remote Identification of Encrypted Video Streams", USENIX Security Symposium, Aug. 2017.

Zhang, Xiaokuan "Statistical Privacy for Streaming Traffic", Network and Distributed Systems Security (NDSS) Symposium, Feb. 2019.

* cited by examiner

FIG.5

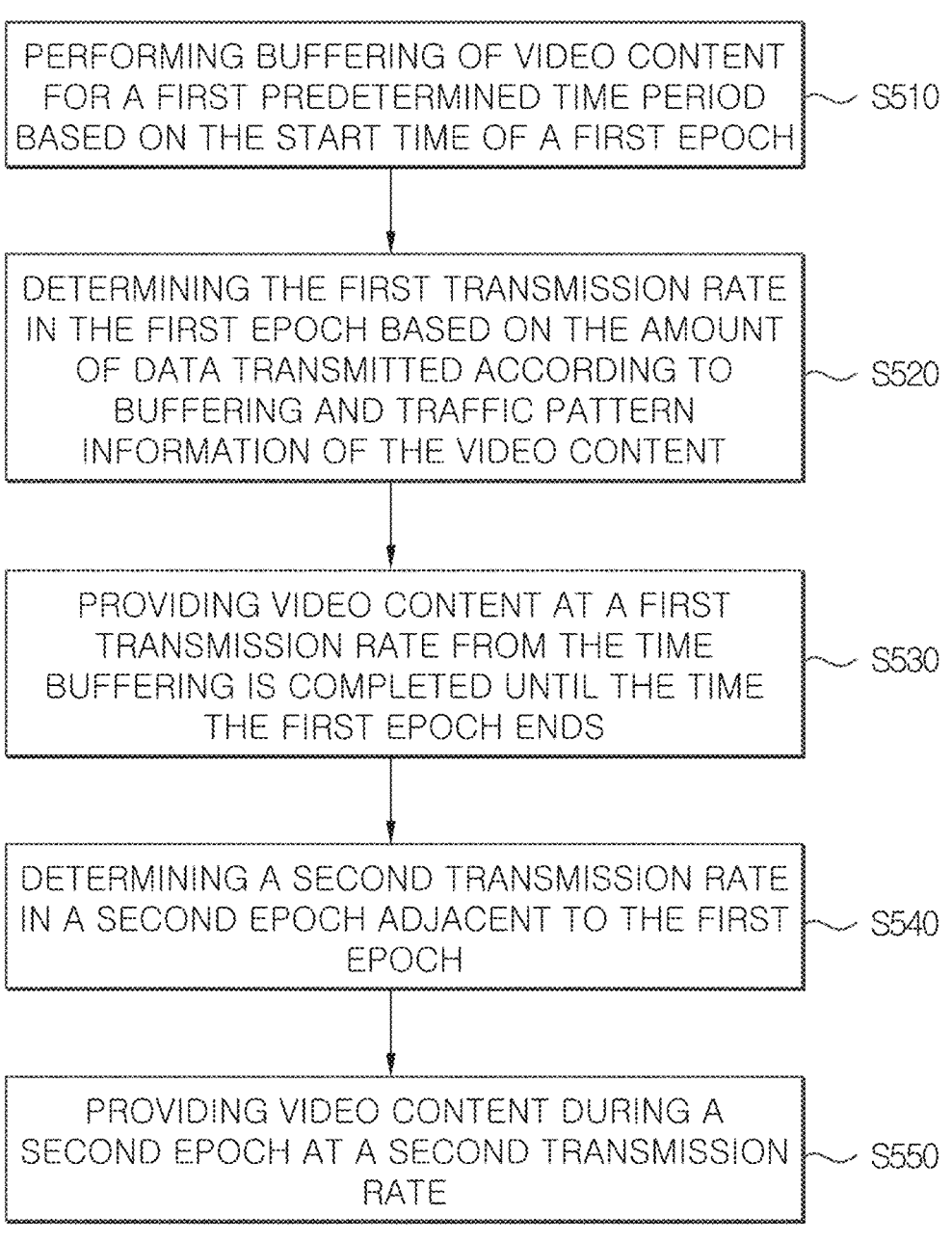

PERFORMING BUFFERING OF VIDEO CONTENT FOR A FIRST PREDETERMINED TIME PERIOD BASED ON THE START TIME OF A FIRST EPOCH — S510

DETERMINING THE FIRST TRANSMISSION RATE IN THE FIRST EPOCH BASED ON THE AMOUNT OF DATA TRANSMITTED ACCORDING TO BUFFERING AND TRAFFIC PATTERN INFORMATION OF THE VIDEO CONTENT — S520

PROVIDING VIDEO CONTENT AT A FIRST TRANSMISSION RATE FROM THE TIME BUFFERING IS COMPLETED UNTIL THE TIME THE FIRST EPOCH ENDS — S530

DETERMINING A SECOND TRANSMISSION RATE IN A SECOND EPOCH ADJACENT TO THE FIRST EPOCH — S540

PROVIDING VIDEO CONTENT DURING A SECOND EPOCH AT A SECOND TRANSMISSION RATE — S550

METHOD AND DEVICE FOR STREAMING DATA BASED ON TRANSMISSION RATE CONTROL METHOD

CROSS-REFERENCE TO RELATED APPLICATIONS

This application claims the benefit of earlier filing date and right of priority to Korean Application No. 10-2023-0171260, filed on Nov. 30, 2023, the contents of which are all hereby incorporated by reference herein in their entirety.

TECHNICAL FIELD

The present disclosure relates to data streaming technology, and more particularly, to a method and device for degrading the performance of inference attacks by streaming data based on a transmission rate control method.

BACKGROUND

A wide variety of data is transmitted via data streaming over the Internet. Common examples include video and audio streams, which are often transmitted using Variable Bit Rate (VBR) encoding, where the data rate fluctuates over time.

Protecting the privacy of users receiving these services is essential, as the content transmitted through data streams can potentially be observed on the network, raising privacy concerns.

To address this, most content providers encrypt data streams before delivering them to users.

This encryption ensures that even if an Internet Service Provider (ISP) or a malicious attacker observes the data being streamed, it becomes difficult to determine the specific content a user is accessing.

However, recent advancements in machine learning have demonstrated that encrypted data streams can still be analyzed and identified, potentially compromising user privacy. This has highlighted an increasing need for enhanced methods to safeguard the privacy of data streamed to users.

SUMMARY

The technical problem of the present disclosure is to provide a method and device for degrading the performance of an inference attack by streaming data based on a transmission rate (or speed) control method.

The technical problem of the present disclosure is to provide a method and device capable of degrading the performance of an inference attack by dividing a transmitted data stream into epoch units.

The technical problems to be achieved in the present disclosure are not limited to the technical tasks mentioned above, and other technical problems not mentioned will be clearly understood by those skilled in the art from the description below.

As an example of the present disclosure, a method of streaming data based on a transmission rate control method performed by a device may include performing buffering on video content for a first predetermined time period based on a start time of a first epoch; determining a first transmission rate in the first epoch based on an amount of data transmitted according to the buffering and traffic pattern information of the video content; providing the video content at the first transmission rate from a time point at which the buffering is completed to a time point at which the first epoch ends;

determining a second transmission rate in a second epoch adjacent to the first epoch based on an accumulated amount of data transmitted until the time point at which the first epoch ends and traffic pattern information of the video content; and providing the video content during the second epoch at the second transmission rate.

In addition, the traffic pattern information of the video content may include at least one of amount of data required for streaming the video content for each of a plurality of epochs or a time-sequence graph calculated based on accumulated amount of data required for streaming the video content for each of the plurality of epochs, and a x-axis and y-axis of the time sequence graph may represent accumulated amount of data of the video content transmitted over time, respectively.

In addition, the first transmission rate $(r_1)$ may be a slope value of a first straight line connecting a first coordinate and i) a second coordinate on the time sequence graph within the first epoch or ii) a third coordinate having a y-axis value greater than the second coordinate, and each of the x-axis value and the y-axis value of the first coordinate may be a time point $(T_B)$ at which the buffering is completed and an amount of data $(S_B)$ transmitted according to the buffering.

In addition, based on the amount of data required for streaming the video content, noise data value (e) to be transmitted by the device may be determined.

In addition, based on the amount of data required for streaming the video content exceeding a threshold value, a noise value may be set to 0, and based on the amount of data required for streaming the video content being less than the threshold value, the noise value may be set to a non-zero positive number.

In addition, the determining the second transmission rate may include performing buffering on the video content for a second predetermined time period based on a start time of the first epoch; and determining the second transmission rate based on 'a sum of the accumulated data amount transmitted until the time point at which the first epoch ends and an amount of data transmitted according to buffering during the second predetermined time period' and traffic pattern information of the video content.

In addition, an entire data for streaming the video content may be divided into a plurality of epoch units by the device, and traffic pattern information of the video content may be output based on metadata of the entire data divided into the plurality of epoch units.

In addition, whether to perform buffering in the second epoch may be determined based on a network status for transmitting the video content.

According to one embodiment of the present disclosure, a device that streams data based on a transmission rate control method may include at least one memory; and at least one processor, and the at least one processor may be configured to: perform buffering on video content for a first predetermined time period based on a start time of a first epoch; determine a first transmission rate in the first epoch based on an amount of data transmitted according to the buffering and traffic pattern information of the video content; provide the video content at the first transmission rate from a time point at which the buffering is completed to a time point at which the first epoch ends; determine a second transmission rate in a second epoch adjacent to the first epoch based on an accumulated amount of data transmitted until the time point at which the first epoch ends and traffic pattern information of the video content; and provide the video content during the second epoch at the second transmission rate.

In addition, wherein the at least one processor may be configured to: perform buffering on the video content for a second predetermined time period based on a start time of the first epoch; and determine the second transmission rate based on 'a sum of the accumulated data amount transmitted until the time point at which the first epoch ends and an amount of data transmitted according to buffering during the second predetermined time period' and traffic pattern information of the video content.

According to one embodiment of the present disclosure, A system for streaming data based on a transmission rate control method may include a device providing video content; and a terminal of a user receiving the video content, and the device may be configured to: perform buffering on video content for a first predetermined time period based on a start time of a first epoch; determine a first transmission rate in the first epoch based on an amount of data transmitted according to the buffering and traffic pattern information of the video content; provide the video content at the first transmission rate from a time point at which the buffering is completed to a time point at which the first epoch ends; determine a second transmission rate in a second epoch adjacent to the first epoch based on an accumulated amount of data transmitted until the time point at which the first epoch ends and traffic pattern information of the video content; and provide the video content during the second epoch at the second transmission rate to the terminal.

According to one embodiment of the present disclosure, one or more non-transitory computer-readable media storing one or more instructions, the one or more instructions being executed by one or more processors, such that a device for streaming data based on a transmission rate control scheme is controlled to perform: performing buffering on video content for a first predetermined time period based on a start time of a first epoch; determining a first transmission rate in the first epoch based on an amount of data transmitted according to the buffering and traffic pattern information of the video content; providing the video content at the first transmission rate from a time point at which the buffering is completed to a time point at which the first epoch ends; determining a second transmission rate in a second epoch adjacent to the first epoch based on an accumulated amount of data transmitted until the time point at which the first epoch ends and traffic pattern information of the video content; and providing the video content during the second epoch at the second transmission rate.

The features briefly summarized above with respect to the disclosure are merely exemplary aspects of the detailed description of the disclosure that follows, and do not limit the scope of the disclosure.

According to various embodiments of the present disclosure, a method and device for degrading the performance of an inference attack by streaming data based on a transmission rate control method may be provided.

According to various embodiments of the present disclosure, a method and device may be provided that can degrade the performance of an inference attack by dividing a transmitted data stream into epoch units.

The effects obtainable in the present disclosure are not limited to the effects mentioned above, and other effects not mentioned will be clearly understood by those skilled in the art from the description below.

BRIEF DESCRIPTION OF THE DRAWINGS

FIG. 5 is a flowchart for describing a method for streaming data based on a transmission rate adjustment method according to an embodiment of the present disclosure.

DETAILED DESCRIPTION

Figure 1:
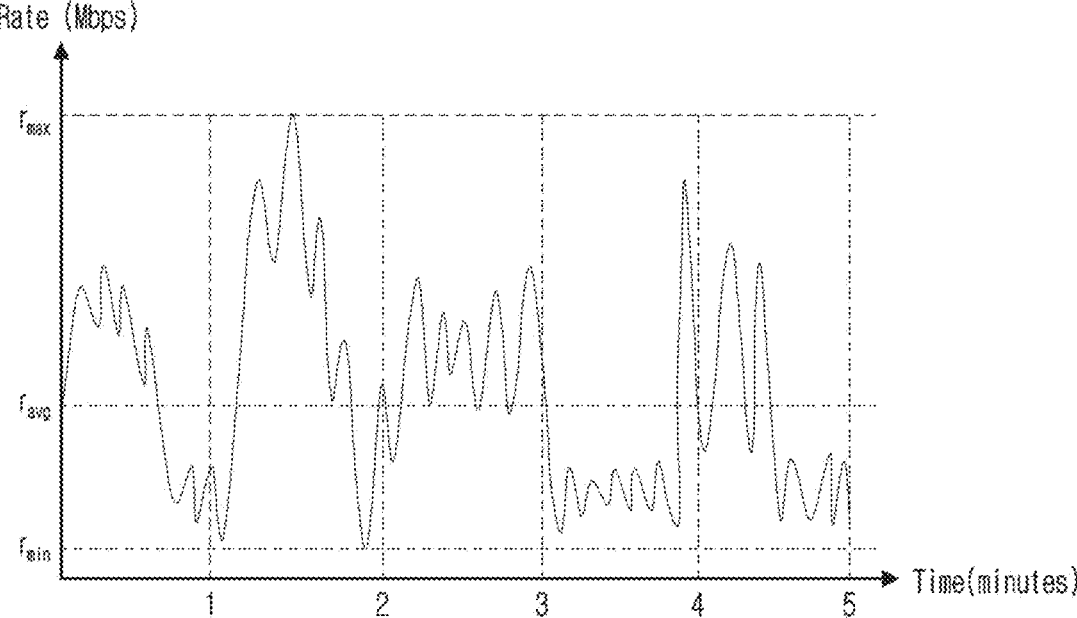
FIG. 1 illustrates a variable data transmission rate of an image according to an embodiment of the present disclosure.

Since the present disclosure can make various changes and have various embodiments, specific embodiments are illustrated in the drawings and described in detail in the detailed description. However, this is not intended to limit the present disclosure to specific embodiments, and should be understood to include all modifications, equivalents, and substitutes included in the idea and scope of the present disclosure. Similar reference numbers in the drawings indicate the same or similar function throughout the various aspects. The shapes and sizes of elements in the drawings may be exaggerated for clarity. Detailed description of exemplary embodiments to be described later refers to the accompanying drawings, which illustrate specific embodiments by way of example. These embodiments are described in sufficient detail to enable those skilled in the art to practice the embodiments. It should be understood that the various embodiments are different, but need not be mutually exclusive. For example, specific shapes, structures, and characteristics described herein may be implemented in another embodiment without departing from the idea and scope of the present disclosure in connection with one embodiment. Additionally, it should be understood that the location or arrangement of individual components within each disclosed embodiment may be changed without departing from the spirit and scope of the embodiment. Accordingly, the detailed description set forth below is not to be taken in a limiting sense, and the scope of the exemplary embodiments, if properly described, is limited only by the appended claims, along with all equivalents as claimed by those claims.

In this disclosure, terms such as first and second may be used to describe various components, but the components should not be limited by the terms. These terms are only used for the purpose of distinguishing one component from another. For example, a first element may be termed a second element, and similarly, a second element may be termed a first element, without departing from the scope of the present disclosure. The term and/or includes a combination of a plurality of related recited items or any one of a plurality of related recited items.

When an element of the present disclosure is referred to as being "connected" or "connected" to another element, it may be directly connected or connected to the other element, but it should be understood that other components may exist in the middle. On the other hand, when an element is referred to as "directly connected" or "directly connected" to another element, it should be understood that no other element exists in the middle.

Components appearing in the embodiments of the present disclosure are shown independently to represent different characteristic functions, and do not mean that each component is composed of separate hardware or a single software component. That is, each component is listed and included as each component for convenience of description, and at least two components of each component are combined to form one component, or one component can be divided into a plurality of components to perform functions. An integrated embodiment and a separate embodiment of each of these components are also included in the scope of the present disclosure unless departing from the essence of the present disclosure.

Terms used in the present disclosure are only used to describe specific embodiments, and are not intended to limit the present disclosure. Singular expressions include plural expressions unless the context clearly dictates otherwise. In the present disclosure, terms such as "comprise" or "have" are intended to designate that there are features, numbers, steps, operations, components, parts, or combinations thereof described in the specification, and it should be understood that this does not preclude the possibility of the presence or addition of one or more other features, numbers, steps, operations, components, parts, or combinations thereof. That is, the description of "including" a specific configuration in the present disclosure does not exclude configurations other than the corresponding configuration, and means that additional configurations may be included in the practice of the present disclosure or the scope of the technical spirit of the present disclosure.

Some of the components of the present disclosure may be optional components for improving performance rather than essential components that perform essential functions in the present disclosure. The present disclosure may be implemented including only components essential to implement the essence of the present disclosure, excluding components used for performance improvement, and a structure including only essential components excluding optional components used only for performance improvement is also included in the scope of the present disclosure.

Hereinafter, embodiments of the present disclosure will be described in detail with reference to the drawings. In describing the embodiments of this specification, if it is determined that a detailed description of a related known configuration or function may obscure the gist of the present specification, the detailed description will be omitted. The same reference numerals are used for the same components in the drawings, and redundant descriptions of the same components are omitted.

The system and/or method/device (hereinafter simply referred to as the 'system') proposed in the present disclosure relates to a technology for streaming data based on a transmission rate control method.

As mentioned above, advances in machine learning have led to the development of technologies that can identify streaming data despite encryption.

Specifically, when the amount of data (e.g., video data) transmitted from a content provider is not constant over time (e.g., VBR), the type and/or characteristics of the content delivered from the content provider can be statistically identified based on the pattern of change in the amount of data.

For example, assume that a user watches a movie through a content providing application. The movie can be divided into durations (or intervals) where scenes change rapidly (high bit rate) and durations (or intervals) where scenes are static (low bit rate) over time, and the order and/or pattern of the durations (or intervals) where scenes change rapidly and the sections where scenes are static can be uniquely identified for each movie.

If an artificial intelligence algorithm that learns the patterns of each movie is applied, it can identify which movie the user is watching.

As an example, FIG. 1 shows the amount of data transmitted (data rate) over time in relation to a video played for 5 minutes. A high data rate is output between 1 and 2 minutes after the video starts, as this is a section where the screen of the video being played changes rapidly, and a low data rate is output between 3 and 4 minutes, as this is a section where the screen of the video being played has little change.

As illustrated in FIG. 1, when the amount of data transmitted by a VBR image is measured over a certain time window, a machine learning model can be used to infer with a high probability which image (Y) was transmitted from the content provider.

That is, a model $P_\theta$ (Y|X) that is $P_\theta$ (Y=i|X)≈1 and satisfies "$P_\theta$ (Y=j|X)≈0 for all j≠i" can be learned. The action of inferring information that should not be exposed through methods such as learning is called an inference attack.

To prevent inference attacks in data streaming, a method of inserting noise into data transmitted over time may be applied. That is, when the amount of data actually transmitted is X=(x0, x1, x2, ...), the inference attack performance may be degraded by actually transmitting as much data as X'=(x0+n0, x1+n1, x2+n2, ...). Here, $n_i$ means the amount of noise generated according to a specific distribution.

However, the method of inserting noise into the actual transmitted data described above has the problem that it requires identification of the entire dataset to prevent attacks, and it is difficult to simultaneously secure real-time streaming and efficiency.

Hereinafter, a method for dividing a data stream into epoch units according to one embodiment of the present disclosure to degrade (or hinder) the performance of an inference attack is described.

While conventional noise insertion methods finely adjust the amount of noise, the present disclosure can more efficiently degrade (or hinder) the performance of inference attacks through an epoch-based adjustment method.

Epoch Division (or Classification)

In the present disclosure, streaming data to be transmitted may be divided into Epochs, which are predefined sizes or time units, and the rate at which data is transmitted can be determined in Epoch units.

For convenience of explanation of the configuration of the present disclosure, it is assumed that video data capable of being streamed for 5 minutes as shown in FIG. 1 is transmitted from a content provider to a user.

The data may be played at an average $r_{avg}$ rate for 5 minutes, and may have a maximum Imax and a minimum $r_{min}$ rate.

Here, the Epoch may be determined based on the size or length of the streaming data transmitted on average.

In the configuration of the present disclosure, it is assumed that an Epoch is defined as a time of 1 minute (=60 seconds). That is, the video played for 5 minutes in FIG. 1 may be composed of five Epochs played for 1 minute (i.e., Epochs having a length of 1 minute).

With respect to the video (or image) described with reference to FIG. 1, if the amount of data that changes per hour is expressed cumulatively, it may be represented as a time-sequence graph as in FIG. 2.

Figure 2:
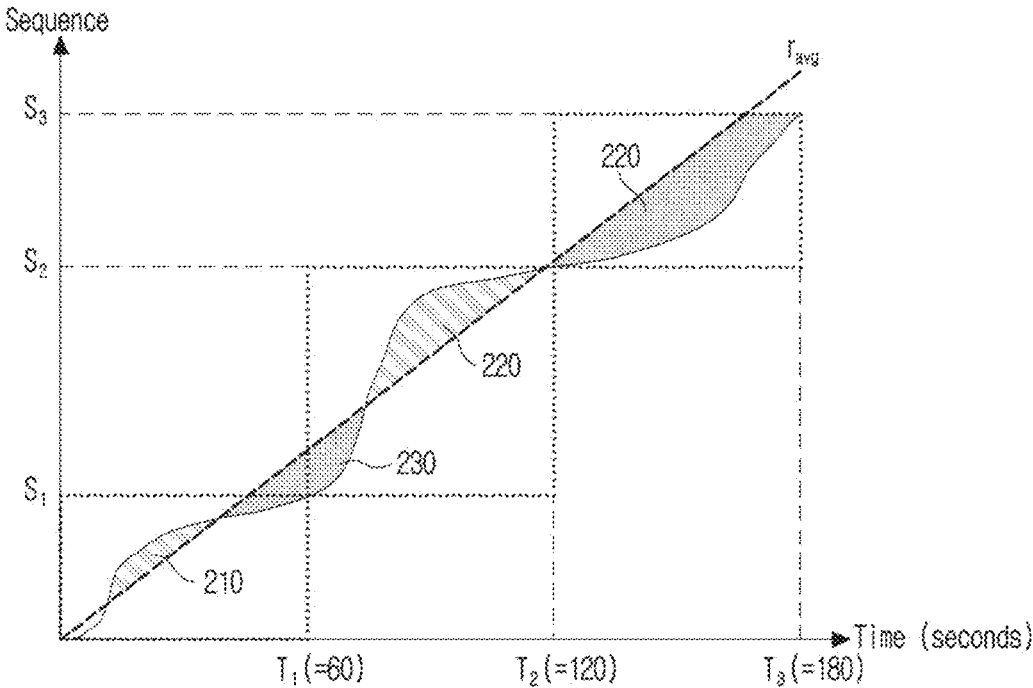
FIG. 2 illustrates a time-sequence graph calculated based on an accumulated amount of data transmitted per hour according to an embodiment of the present disclosure.

That is, FIG. 2 shows the accumulation of the amount of data transmitted during the first 3 epochs, and the dotted line $r_{avg}$ represents the time-sequence when transmitted at the average rate.

If the video is transmitted continuously at the rate of $r_{avg}$ (i.e., if the video is transmitted according to CBR (Constant bit rate)), The first area (210, 220) may represent an area where the video cannot be played due to insufficient data, and the second area (230, 240) may represent an area where data is transmitted earlier than the current playback speed.

If the video cannot be played, it can cause quality of service problems, and if too much data is transmitted ahead of the playback speed, it can waste resources.

Hereinafter, a method for transmitting as much data as is appropriate (i.e. determining an appropriate data transmission rate) but not allowing the streaming data to be identified due to the pattern of the amount of data being transmitted will be described.

Method for Determining Data Transfer Speed

It is assumed that the server transmitting streaming data has all the data in advance and already knows the amount of data (bit rate) that changes per unit time.

That is, it is assumed that the server can identify the amount of data $X(t)=(x0, x1, x2, \ldots)$ transmitted per unit time, and accordingly construct time-sequence graph information as illustrated in FIG. 2.

The unit time for which the change in data volume (VBR) occurs can be much smaller than the unit of Epoch. For example, if Epoch is 1 minute (=60 seconds), the time unit (time window) of X in which the data volume per hour is recorded can be 100 ms.

The streaming data being transmitted has a total size of M Bytes. In the $i^{th}$ Epoch, a total of $S_i$-$S_{i-1}$ Bytes of data bytes can be transmitted from the $S_{i-1}$th data byte to the $S_{i-1}$th data byte.

Since the first Epoch is transmitted starting from the $0^{th}$ data byte with index 0, $S_0$ can be 0. That is, the index of the data byte can start from 0.

In one embodiment of the present disclosure, the rate at which data is transmitted in the $i^{th}$ epoch (i.e., $r_i$) may be determined according to the method described below.

1. (Initial buffering) Initial buffering of data may optionally be performed in one Epoch.

By transmitting as fast as possible for a given time or a given number of data bytes, the real-time nature of streaming can be prevented from being reduced due to temporary network delays.

Figure 3:
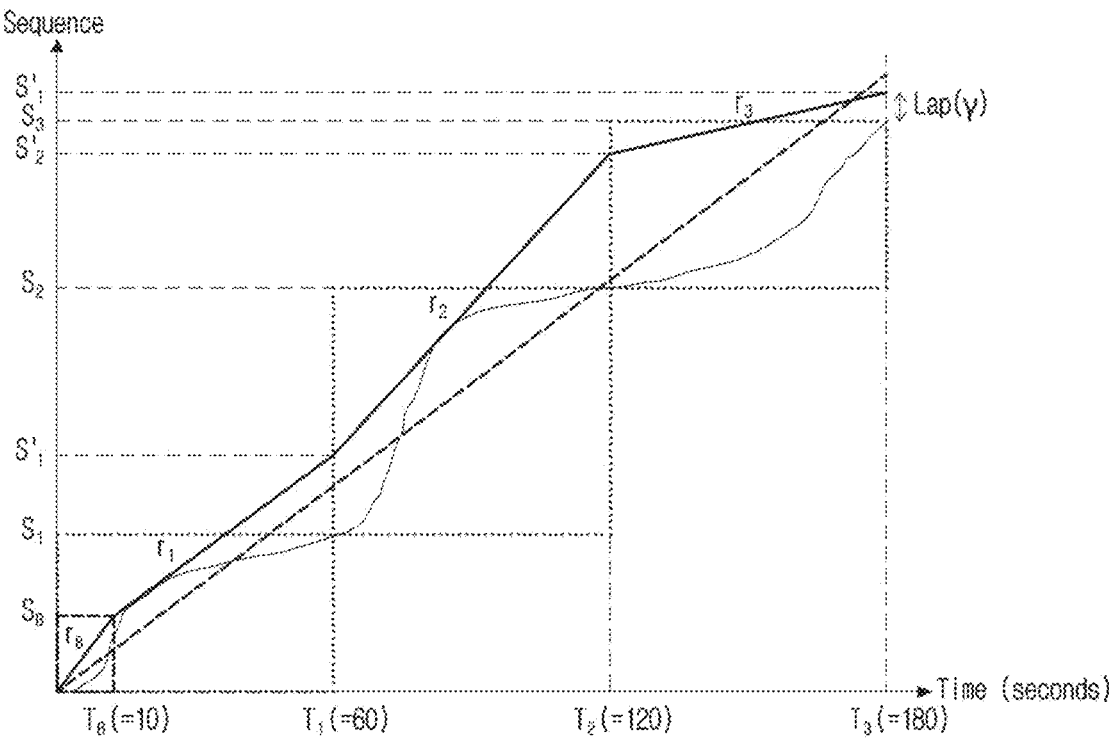
FIG. 3 is a diagram for describing a method for determining a transmission rate according to an embodiment of the present disclosure.

For example, when the Epoch is 60 seconds, initial buffering can be performed for 10 seconds, which allows data as much as $S_B$ to be transmitted at a rate of $r_B$ for $T_B$ (=10 seconds), as shown in FIG. 3.

$r_B$ may be set to a rate higher than the unlimited or normal streaming rate (e.g., $r_i$). In this case, the transmission rate may be limited by the constraints of the lower protocol layers, or the actual transmission rate may be limited by the network conditions.

The above-described initial buffering step may be used optionally, and data may be transmitted to $r_i$ consistently without initial buffering.

2. (Calculation of $r_i$) Given the actual accumulated data amount (=$S_B$) transmitted until the time (=$T_B$) when initial buffering is completed, the rate $r_i$ for transmitting data during the remaining time within the Epoch is the minimum value $r_i$ that satisfies the following Equation 1.

$$\forall t \in [T_B, T_i], S_B + r_i * (t - T_B) \geq X(t) + e \qquad \text{[Equation 1]}$$

That is, the speed $r_i$ may be set to satisfy Equation 2, and t may be set to a value between $(T_B, T_i)$.

$$r_i \leftarrow \min\left(r_i, \frac{X(t) + e - S_B}{t - T_B}\right) \qquad \text{[Equation 2]}$$

In the absence of initial buffering, it may be calculated as $T_B \leftarrow T_{i-1}$, $S_B \leftarrow S_{i-1}$, where e is the amount of data transmitted in addition to $X(t)$, which is the amount of data required for actual streaming.

When e=0, $r_i$ represents the slope of a straight line tangent to $X(t)$ when drawn from the point of the time-sequence transmitted so far, which has a constant slope. e may be obtained/determined from a value that follows a specific distribution.

For example, the value $e=Lap(\gamma)$ generated via the Laplace mechanism may be used.

FIG. 3 illustrates how the transmission rates $r_1$, $r_2$ or $r_3$ in three epochs are determined.

Specifically, in the case of FIG. 3, e may be defined as $Lap(\gamma)$ in Epochs satisfying "$X(i)/T_i>X(t)/T_t$ for all $T_{i-1}<t<T_i$", and is defined as 0 in other Epochs.

Figure 4:
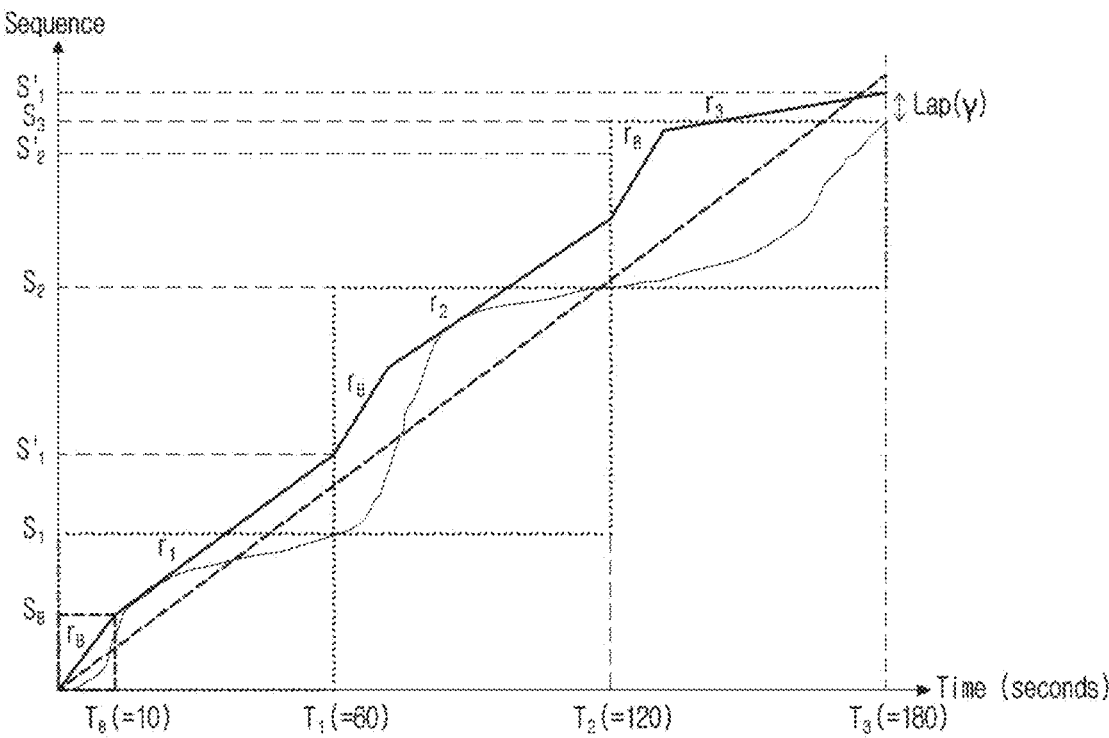
FIG. 4 is a diagram for describing a method for determining a transmission rate when buffering is applied to each slot (or epoch) according to an embodiment of the present disclosure.

FIG. 4 illustrates how the transmission rate $r_i$ is determined when initial buffering is performed at all epochs in addition to the initial epoch. In this case, since initial buffering is performed at the start of all epochs, data may be transmitted at a rate of $r_B$ for 10 seconds.

The actual transmission rate may be less than $r_B$ depending on the speed limits of the lower protocol layers or network conditions.

Method of Setting the Value of e

In the equation for determining $r_i$ described above, the value of e may determine how much more data to transmit than the actual streaming data requires in real time.

As an example of the present disclosure, e may be set to 0 for efficiency. As another example, e may be set to a large value to have greater resistance to inference attacks.

For example, the value of e may be used as determined via $Lap(\gamma)$ or the Laplace mechanism.

In FIG. 3 and/or FIG. 4, examples of setting e differently for each Epoch are shown. When the demand for data existing in the middle of an Epoch is large (i.e., when "$X(i)/T_i>X(t)/Tt$ for all $T_{i-1}<t<T_i$" is not satisfied), e may be set to 0, and in other cases, e may be set to $Lap(\gamma)$.

When the value of e is set in the manner described above, data can be transmitted at the rate required for efficient transmission while the amount of data for actual streaming is not exposed at the end of every Epoch.

According to various embodiments of the present disclosure described above, 1) an operation of dividing streaming data (i.e., data according to video content) by Epoch units, 2) an operation of transmitting/streaming data at a determined rate within an Epoch, and 3) an operation of performing initial buffering according to a network condition or policy and determining a transmission rate to be determined later according to the amount of data actually transmitted in the network may be performed.

By the above-described operations, it is possible to effectively prevent inference attacks by other users when providing data according to video content.

FIG. 5 is a flowchart illustrating a method of streaming data based on a transmission rate control method according to one embodiment of the present disclosure.

Figure 6:
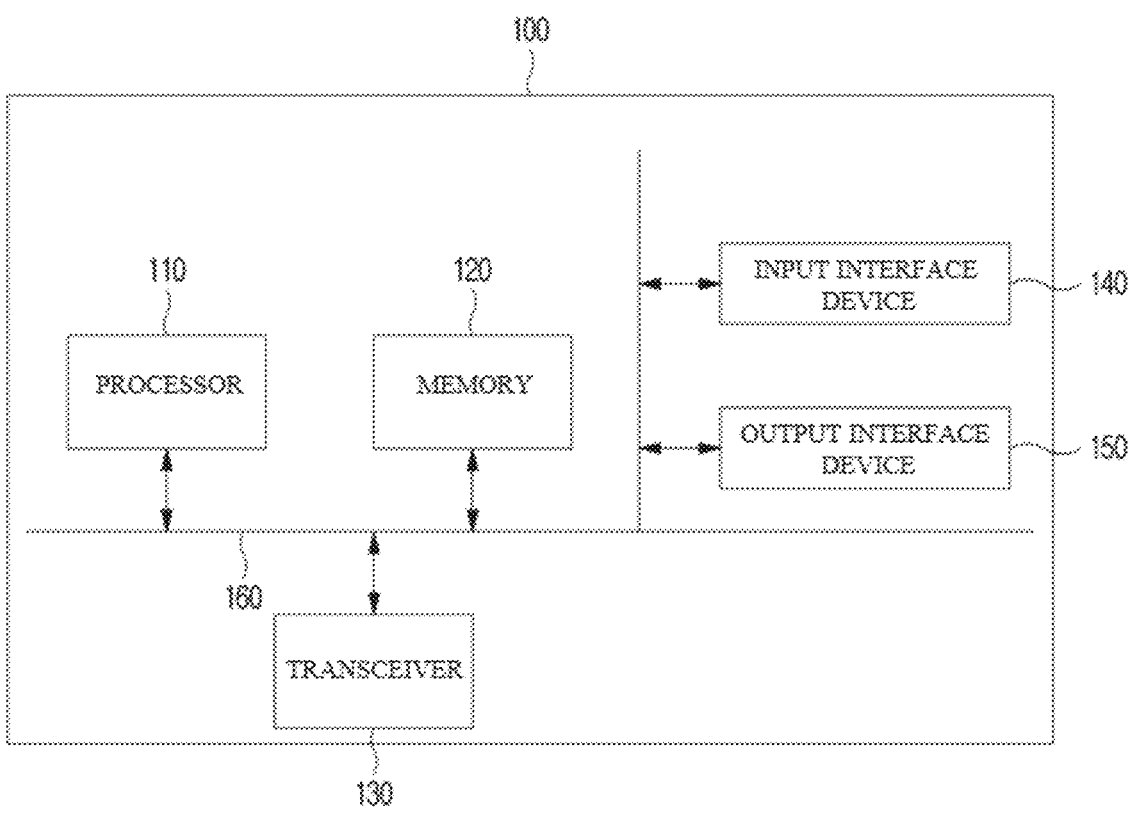
FIG. 6 illustrates a configuration of a device for streaming data based on a transmission rate adjustment method according to an embodiment of the present disclosure.

The devices described in FIGS. 5 and 6 collectively refer to devices that provide video content to other users (i.e., terminal devices used by users). The devices that provide video content may include, but are not limited to, server devices. The devices that provide video content may also be implemented as a group of devices that combine one or more types of electronic devices.

Here, the device may divide the entire data for streaming video content to a terminal device used by another user into epoch units in advance. The device may extract and store metadata of the entire data divided into multiple epoch units (e.g., the number of multiple epochs, the time interval length for each epoch, the amount of data changing for each epoch, etc.).

The device may output traffic pattern information of video content based on metadata of the entire data divided into multiple epoch units.

Here, the traffic pattern information of the video content may include at least one of "the amount of data required for streaming the video content for a plurality of epochs" or "a time-sequence graph calculated based on the accumulated amount of data required for streaming the video content for a plurality of epochs".

Here, the x-axis and y-axis of the time sequence graph may each mean the accumulated amount of data of the video content transmitted over time.

That is, as shown in FIGS. 2 to 4, the device can output traffic information of video content in advance and store traffic information of the output video content.

The device may perform buffering of video content for a first predetermined time period based on the start time of a first epoch (or unit time period) (S510).

The device may determine in advance the time period for performing buffering according to network conditions, etc. for transmitting video content.

And, the device may determine the data transmission rate during the time period during which buffering is performed to be a higher rate than the transmission rate determined for each epoch. For example, the device may determine the data transmission rate during the time period during which buffering is performed to be the maximum rate possible within the network conditions.

The device may determine the first transmission rate in the first epoch based on the amount of data transmitted according to buffering and traffic pattern information of the video content (S520).

For example, the first transmission rate ($r_1$) may be a slope value of a first straight line connecting a first coordinate and i) a second coordinate on a time sequence graph within the first epoch or ii) a third coordinate having a y-axis value greater than that of the second coordinate.

Here, the x-axis value and the y-axis value of the first coordinate may be the point in time ($T_B$) when buffering is completed and the amount of data ($S_B$) transmitted according to buffering.

For example, if a noise value is added to the amount of data required for streaming video content at a certain point in time within the first epoch, the first transmission rate may be determined by the slope value of the first straight line connecting the first coordinate and the third coordinate.

As an example of the present disclosure, a noise data value (e) to be transmitted by the device may be determined based on an amount of data required for streaming video content.

As an example of the present disclosure, the noise value may be set to 0 based on the amount of data required for streaming video content exceeding a threshold. When the noise value is 0, the first straight line may be tangent to the time sequence graph.

As another example of the present disclosure, based on the amount of data required for streaming video content being less than or equal to a threshold, the noise value may be set to a non-zero positive number. When the noise value is a non-zero positive number, the y value of the first straight line at the same point in time may be higher than the y value of the time sequence graph.

The device may provide video content at a first transmission rate from the time buffering is completed until the time the first epoch ends (S530).

That is, the device may transmit/stream data according to the video content to another device from the time buffering is completed at the first transmission rate until the time the first epoch ends.

The device may determine a second transmission rate in a second epoch adjacent to the first epoch based on the accumulated amount of data transmitted up to the time when the first epoch ends and traffic pattern information of the video content (S540).

The device may determine the second transmission rate in the second epoch by using the accumulated amount of data transmitted and traffic pattern information of the video content up to the end of the first epoch in the same manner as the first transmission rate is determined.

Here, the device may determine whether to perform buffering in the second epoch based on the network conditions for transmitting the video content. That is, the device may determine whether buffering in the second epoch is necessary based on the network conditions.

As an example of the present disclosure, assume that it is decided to perform buffering in the second epoch.

Here, the device may perform buffering on the video content for a second predefined time period based on the start time of the first epoch. The device may determine the second transmission rate based on 'the sum of the accumulated data amount transmitted until the end time of the first epoch and the amount of data transmitted according to buffering during the second predefined time period' and traffic pattern information of the video content.

The device may provide video content during a second epoch at a second transmission rate (S550).

That is, the device may divide the video content into multiple epoch units and determine the transmission rate for each epoch. By constantly transmitting/streaming the video content at the transmission rate determined for each epoch, the device may effectively prevent inference attacks by other users.

FIG. 6 illustrates a configuration of a device for streaming data based on a speed control method according to one embodiment of the present disclosure.

Specifically, the device (100) in FIG. 6 may collectively refer to a device (e.g., a server, etc.) that can transmit/stream data according to video content to another device as described above.

The processor (110) may be implemented in various types such as an AP (Application Processor), a CPU (Central Processing Unit), a GPU (Graphic Processing Unit), etc., and may be any semiconductor device that executes a command stored in the memory (120). The processor (110) may execute a program command stored in the memory (120).

The processor (110) may be implemented in various types such as an AP (Application Processor), a CPU (Central Processing Unit), a GPU (Graphic Processing Unit), etc., and may be any semiconductor device that executes a command stored in the memory (120). The processor (110) may execute a program command stored in the memory (120). The processor (110) may perform an operation of streaming data based on a transmission rate control method based on the above-described FIGS. 1 to 5.

The processor (110) may include one or more modules for performing an operation of streaming data based on a transmission rate control method.

And/or, the processor (110) may store program instructions for implementing at least one function for one or more modules in the memory (120) so as to control the operations described based on FIGS. 1 to 5 to be performed. That is, each operation and/or function according to FIGS. 1 to 5 may be executed by one or more processors (110).

The memory (120) may include various forms of volatile or non-volatile storage media. For example, the memory (120) may include a read-only memory (ROM) and a random access memory (RAM). In an embodiment of the present disclosure, the memory (120) may be located inside or outside the processor (110), and the memory (120) may be connected to the processor (110) through various means already known.

The transceiver (130) may perform a function of transmitting and receiving data processed/to be processed by the processor (110) with an external device and/or an external system.

For example, the transceiver (130) may be utilized for data exchange with other terminal devices, etc.

The input interface device (140) may be configured to provide data to the processor (110).

The output interface device (150) may be configured to output data from the processor (110).

Components described in the exemplary embodiments of the present disclosure may be implemented by hardware elements. For example, The hardware element may include at least one of a digital signal processor (DSP), a processor, a controller, an application specific integrated circuit (ASIC), a programmable logic element such as an FPGA, a GPU, other electronic devices, or a combination thereof. At least some of the functions or processes described in the exemplary embodiments of the present disclosure may be implemented as software, and the software may be recorded on a recording medium. Components, functions, and processes described in the exemplary embodiments may be implemented as a combination of hardware and software.

The method according to an embodiment of the present disclosure may be implemented as a program that can be executed by a computer, and the computer program may be recorded in various recording media such as magnetic storage media, optical reading media, and digital storage media.

Various techniques described in this disclosure may be implemented as digital electronic circuits or computer hardware, firmware, software, or combinations thereof. The above techniques may be implemented as a computer program product, that is, a computer program or computer program tangibly embodied in an information medium (e.g., machine-readable storage devices (e.g., computer-readable media) or data processing devices), a computer program implemented as a signal processed by a data processing device or propagated to operate a data processing device (e.g., a programmable processor, computer or multiple computers).

Computer program(s) may be written in any form of programming language, including compiled or interpreted languages. It may be distributed in any form, including stand-alone programs or modules, components, subroutines, or other units suitable for use in a computing environment. A computer program may be executed by a single computer or by a plurality of computers distributed at one or several sites and interconnected by a communication network.

Examples of information medium suitable for embodying computer program instructions and data may include semiconductor memory devices (e.g., magnetic media such as hard disks, floppy disks, and magnetic tapes), optical media such as compact disk read-only memory (CD-ROM), digital video disks (DVD), etc., magneto-optical media such as floptical disks, and ROM (Read Only Memory), RAM (Random Access Memory), flash memory, EPROM (Erasable Programmable ROM), EEPROM (Electrically Erasable Programmable ROM) and other known computer readable media. The processor and memory may be complemented or integrated by special purpose logic circuitry.

A processor may execute an operating system (OS) and one or more software applications running on the OS. The processor device may also access, store, manipulate, process and generate data in response to software execution. For simplicity, the processor device is described in the singular number, but those skilled in the art may understand that the processor device may include a plurality of processing elements and/or various types of processing elements. For example, a processor device may include a plurality of processors or a processor and a controller. Also, different processing structures may be configured, such as parallel processors. In addition, a computer-readable medium means any medium that can be accessed by a computer, and may include both a computer storage medium and a transmission medium.

Although this disclosure includes detailed descriptions of various detailed implementation examples, it should be understood that the details describe features of specific exemplary embodiments, and are not intended to limit the scope of the invention or claims proposed in this disclosure.

Features individually described in exemplary embodiments in this disclosure may be implemented by a single exemplary embodiment. Conversely, various features that are described for a single exemplary embodiment in this disclosure may also be implemented by a combination or appropriate sub-combination of multiple exemplary embodiments. Further, in this disclosure, the features may operate in particular combinations, and may be described as if initially the combination were claimed. In some cases, one or more features may be excluded from a claimed combination, or a claimed combination may be modified in a sub-combination or modification of a sub-combination.

Similarly, although operations are described in a particular order in a drawing, it should not be understood that it is necessary to perform the operations in a particular order or order, or that all operations are required to be performed in order to obtain a desired result. Multitasking and parallel processing can be useful in certain cases. In addition, it should not be understood that various device components must be separated in all exemplary embodiments of the embodiments, and the above-described program components and devices may be packaged into a single software product or multiple software products.

Exemplary embodiments disclosed herein are illustrative only and are not intended to limit the scope of the disclosure. Those skilled in the art will recognize that various modifications may be made to the exemplary embodiments without departing from the spirit and scope of the claims and their equivalents.

Accordingly, it is intended that this disclosure include all other substitutions, modifications and variations falling within the scope of the following claims.

What is claimed is:

1. A method of streaming data performed by a device, the method comprising:

performing buffering on video content for a first predetermined time period based on a start time of a first epoch;

determining a first transmission rate in the first epoch based on an amount of data transmitted according to the buffering and traffic pattern information of the video content;

providing the video content at the first transmission rate from a time point at which the buffering is completed to a time point at which the first epoch ends;

determining a second transmission rate in a second epoch adjacent to the first epoch based on an accumulated amount of data transmitted until the time point at which the first epoch ends and the traffic pattern information of the video content; and providing the video content during the second epoch at the second transmission rate, wherein, based on an amount of data required for streaming the video content, a noise data value (e) to be transmitted by the device is determined, wherein, based on the amount of data required for streaming the video content exceeding a threshold value, the noise data value is set to 0, and wherein, based on the amount of data required for streaming the video content being less than the threshold value, the noise data value is set to a non-zero positive number.

2. The method of claim 1, wherein:

the traffic pattern information of the video content includes at least one of the amount of data required for streaming the video content for each of a plurality of epochs or a time-sequence graph calculated based on an accumulated amount of data required for streaming the video content for each of the plurality of epochs, and an x-axis of the time-sequence graph represents time and a y-axis of the time-sequence graph represents an accumulated amount of data of the video content transmitted over time.

3. The method of claim 2, wherein:

the first transmission rate (r1) is a slope value of a first straight line connecting a first coordinate and i) a second coordinate on the time-sequence graph within the first epoch or ii) a third coordinate having a y-axis value greater than the second coordinate, and each of the x-axis value and the y-axis value of the first coordinate is a time point (TB) at which the buffering is completed and an amount of data (SB) transmitted according to the buffering.

4. The method of claim 1, wherein the determining the second transmission rate comprises:

performing buffering on the video content for a second predetermined time period based on the start time of the first epoch; and determining the second transmission rate based on 'a sum of the accumulated amount of data transmitted until the time point at which the first epoch ends and an amount of data transmitted according to buffering during the second predetermined time period' and the traffic pattern information of the video content.

5. The method of claim 1, wherein:

an entire amount of data for streaming the video content is divided into a plurality of epoch units by the device, and the traffic pattern information of the video content is output based on metadata of the entire amount of data divided into the plurality of epoch units.

6. The method of claim 1, wherein:

whether to perform buffering in the second epoch is determined based on a network status for transmitting the video content.

7. A device that streams data based on a transmission rate control method, the device comprising:

at least one memory; and at least one processor, wherein the at least one processor is configured to:

perform buffering on video content for a first predetermined time period based on a start time of a first epoch, determine a first transmission rate in the first epoch based on an amount of data transmitted according to the buffering and traffic pattern information of the video content, provide the video content at the first transmission rate from a time point at which the buffering is completed to a time point at which the first epoch ends, determine a second transmission rate in a second epoch adjacent to the first epoch based on an accumulated amount of data transmitted until the time point at which the first epoch ends and the traffic pattern information of the video content, and provide the video content during the second epoch at the second transmission rate, wherein, based on an amount of data required for streaming the video content, a noise data value (e) to be transmitted by the device is determined, wherein, based on the amount of data required for streaming the video content exceeding a threshold value, the noise data value is set to 0, and wherein, based on the amount of data required for streaming the video content being less than the threshold value, the noise data value is set to a non-zero positive number.

8. The device of claim 7, wherein:

the traffic pattern information of the video content includes at least one of the amount of data required for streaming the video content for each of a plurality of epochs or a time-sequence graph calculated based on an accumulated amount of data required for streaming the video content for each of the plurality of epochs, and an x-axis of the time-sequence graph represents time and a y-axis of the time-sequence graph represents an accumulated amount of data of the video content transmitted over time.

9. The device of claim 8, wherein:

the first transmission rate (r1) is a slope value of a first straight line connecting a first coordinate and i) a second coordinate on the time-sequence graph within the first epoch or ii) a third coordinate having a y-axis value greater than the second coordinate, and each of the x-axis value and the y-axis value of the first coordinate is a time point (TB) at which the buffering is completed and an amount of data (SB) transmitted according to the buffering.

10. The device of claim 7, wherein the at least one processor is configured to:

perform buffering on the video content for a second predetermined time period based on the start time of the first epoch; and determine the second transmission rate based on 'a sum of the accumulated amount of data transmitted until the time point at which the first epoch ends and an amount of data transmitted according to buffering during the second predetermined time period' and the traffic pattern information of the video content.

11. The device of claim 7, wherein:

an entire amount of data for streaming the video content is divided into a plurality of epoch units by the device, and the traffic pattern information of the video content is output based on metadata of the entire amount of data divided into the plurality of epoch units.

12. The device of claim 7, wherein:

whether to perform buffering in the second epoch is determined based on a network status for transmitting the video content.

13. A system for streaming data based on a transmission rate control method, the system comprising:

a device providing video content; and a terminal of a user receiving the video content, wherein the device is configured to:

perform buffering on video content for a first predetermined time period based on a start time of a first epoch,

16 determine a first transmission rate in the first epoch based on an amount of data transmitted according to the buffering and traffic pattern information of the video content, provide the video content at the first transmission rate from a time point at which the buffering is completed to a time point at which the first epoch ends, determine a second transmission rate in a second epoch adjacent to the first epoch based on an accumulated amount of data transmitted until the time point at which the first epoch ends and the traffic pattern information of the video content, and provide the video content during the second epoch at the second transmission rate to the terminal, wherein, based on an amount of data required for streaming the video content, a noise data value (e) to be transmitted by the device is determined, wherein, based on the amount of data required for streaming the video content exceeding a threshold value, the noise data value is set to 0, and wherein, based on the amount of data required for streaming the video content being less than the threshold value, the noise data value is set to a non-zero positive number.

* * * * *